United States Patent [19]

Ishikawa

[11] 3,915,408

[45] Oct. 28, 1975

[54] AUTOMATIC STOP DEVICE FOR A TAPE RECORDER

[75] Inventor: Mitsuo Ishikawa, Yamanashi, Japan

[73] Assignee: Koufu Sanky Kabushiki Kaisha, Yamanashi, Japan

[22] Filed: Feb. 13, 1974

[21] Appl. No.: 442,147

[30] Foreign Application Priority Data

Feb. 15, 1973 Japan .............................. 48-25260
July 6, 1973 Japan .............................. 48-81047

[52] U.S. Cl. .............................. 242/191; 242/210
[51] Int. Cl.[2] .............................. B65H 59/38; G03B 1/02; G11B 15/13
[58] Field of Search .............................. 242/189–191, 242/210; 360/74

[56] References Cited

UNITED STATES PATENTS

| | | | |
|---|---|---|---|
| 3,582,013 | 6/1971 | Beretta | 242/186 |
| 3,653,607 | 4/1972 | Lambeeck et al. | 242/191 |
| 3,677,493 | 7/1972 | Staar | 242/191 |

*Primary Examiner*—Leonard D. Christian
*Attorney, Agent, or Firm*—Haseltine, Lake & Waters

[57] ABSTRACT

An automatic stop device for a tape recorder comprising a first lever having one end provided with a camming opening containing an elongated slot and engaging indentations, the first lever being pivotably mounted on one of the reel tables of the tape recorder in frictional engagement therewith. A second lever has a pin at one end engaged in the camming opening, and the second lever is pivoted on the chassis of the tape recorder such that the pin is rotatably biased towards the elongated slot of the camming opening. An actuating piece is provided with a fan-shaped camming portion at one end, and it is rotatably attached to a side wall of the second lever such that the actuating piece may turn only in a direction perpendicular to the axis of rotation of the second lever, while being rotatably biased in a given direction. A pinion is rotatably driven by a rotary driving source of the tape recorder and a projection is eccentrically mounted on the pinion to contact the fan-shaped camming portion so that under the rotation of the reel table, the pin locks within the camming opening to engage the indentations thereof, whereas when rotation of the reel table ceases, the pin enters the elongated slot of the camming opening to provide a large amount of rotational rocking movement of the second lever for stopping the rotary drive of the tape recorder. The stop device further includes an actuating lever which is pivotably mounted on the chassis of the tape recorder to move the pinch roller away from the capstan and the idler rollers away from the reel tables when a pause push button of the tape recorder is depressed. A rod is connected to a release mechanism for the push buttons and the rod is attached to the actuating piece, and is operated thereby through a mechanism when the pin enters the elongated slot of the camming opening.

8 Claims, 10 Drawing Figures

AUTOMATIC STOP DEVICE FOR A TAPE RECORDER

BACKGROUND OF THE INVENTION

This invention relates to an automatic stop device for a tape recorder, and more particularly to such a device for automatically stopping the operation of a tape recorder in a mechanical fashion by detection of stoppage of reel tables of the tape recorder upon completion of a winding or rewinding operation of the magnetic tape therein. The invention also relates to a temporary stop mechanism or a pause mechanism which temporarily stops the movement of the magnetic tape but does not stop the operation of the tape recorder when the tape is temporarily stopped or when a so-called pause operation is effected.

SUMMARY OF THE INVENTION

According to the present invention, there is provided an automatic stop device for a tape recorder which comprises, a first lever having at its one end a camming opening containing an elongated slot and engaging indentations and pivotably mounted, on one of said reel tables frictionally therewith, a second lever having at its one end a pin engaging the camming opening of said first lever and pivoted on a chassis of the tape recorder in such a manner that said pin is rotatably biased towards the elongated slot of said camming opening of said first lever, an actuating piece having a fan-shaped camming portion at one end and rotatably attached to the side wall of said second lever in such a manner that the actuating piece may turn only in the direction perpendicular to the rotation shaft of said second lever and be rotatably biased in a given direction, a pinion rotatably driven by a rotary driving source of said tape recorder, and a projection eccentrically provided in such a position on said pinion as to be able to make contact with the fan-shaped camming portion of said actuating piece, whereby under rotation of said reel table said pin of said second lever rocks within said camming opening of said first lever to engage the dents thereof while when said reel table stop, said pin enters said elongated slot of said camming opening of the first lever, thereby to provide a large amount of rotational rocking of said second lever so as to detect the stopping of said reel tables of said recorder for stopping the drive thereof.

There is also provided in the present invention a pause mechanism comprising an actuating lever pivotably mounted on the chassis of said tape recorder so as to move the pinch roller away from the capstan shaft and the idler roller away from the reel tables when a pause push button is depressed, said actuating lever including a rocking confining member consisting of a resilient body, one end of which is positioned in such a position as to engage the side wall of said first lever, whereby said first lever is turned in a given direction through said rocking confining member upon turning of said actuating lever due to depression of said pause push button.

BRIEF DESCRIPTION OF THE DRAWINGS

The present invention will be more fully apparent with reference to the accompanying drawings wherein.

DESCRIPTION OF THE PREFERRED EMBODIMENTS

Figure 1:
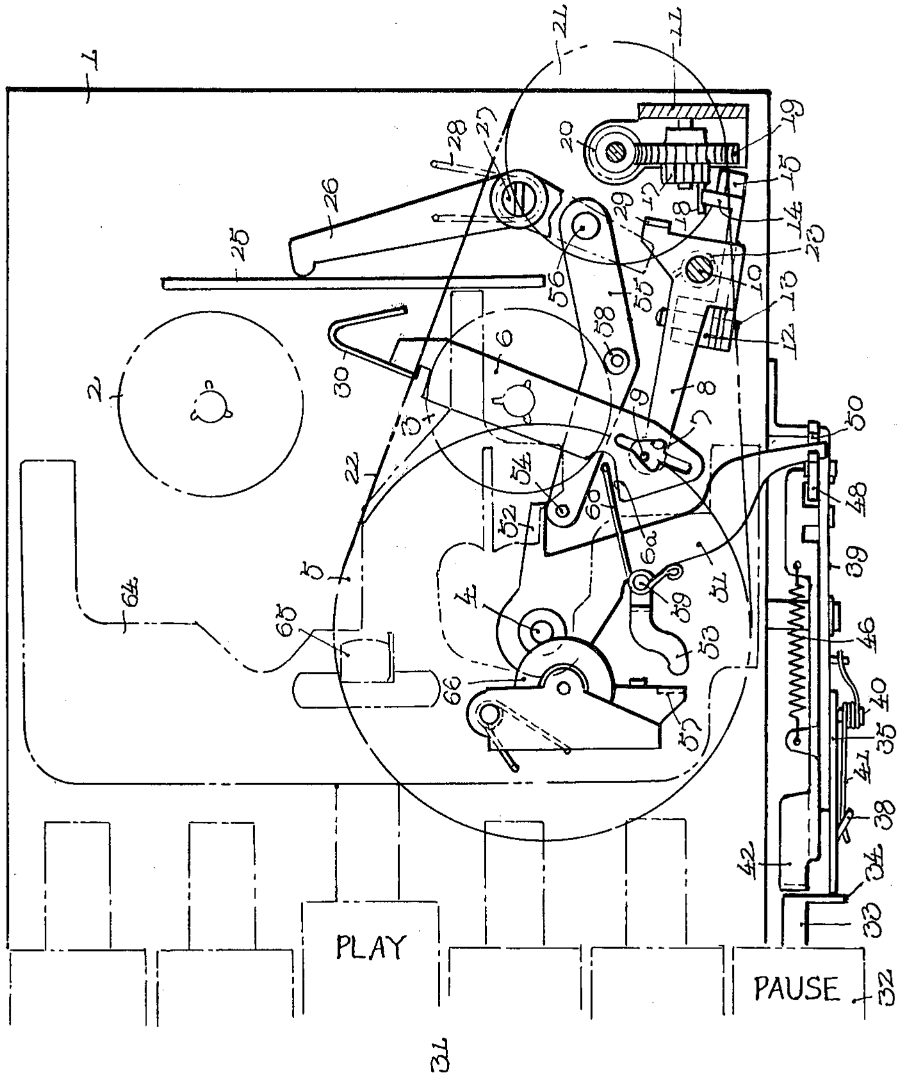
FIG. 1 is a plan view of a major portion of an embodimention of the automatic stop device according to the present invention, the automatic stop device being associated with the tape recorder which is in its playback condition.

Referring now to FIG. 1, therein is shown in a schematic manner an automatic stop device and a pausing mechanism arranged in association therewith. In FIG. 1, reference numeral 1 designates a chassis of a tape recorder on which winding reel tables 2 and 3 are supported and these reel tables 2 and 3 are rotatably driven when idler wheels (not shown) make contact therewith.

A first lever 6 is arranged under the reel table 3 so that the first lever 6 may be rotated in any direction. This lever 6 has a camming shown.

A first lever 6 is arranged on the reel table 3 so that the lever can be rotated together therewith due to friction contact therewith. This lever 6 has a camming opening 7 formed at one end and a second lever 8 has a pin 9 at one end which is loosely engaged in the camming opening 7.

The second lever 8 is pivotably supported by a shaft 10 on a supporting frame 11 fixed on the chassis 1 and an actuating piece 12 is attached to the second lever 8 by a shaft 13 in such a manner that the actuating piece 12 can turn perpendicularly to the lever 8. The actuating piece has at one end a projecting fan-shaped arcuate camming portion 14 and a rack 15 juxtaposed at a position below the cam portion 14, and at its opposite rocking end a rod 16 coupled to the releasing mechanism (engaging plate) of push buttons 31.

A pinion 17 with which the rack 15 is engageable, as will hereinafter be described in detail, is rotatably supported on the supporting frame 11 and has a projection 18 at an eccentric position thereof which is adapted to push the camming portion 14.

Figure 2:
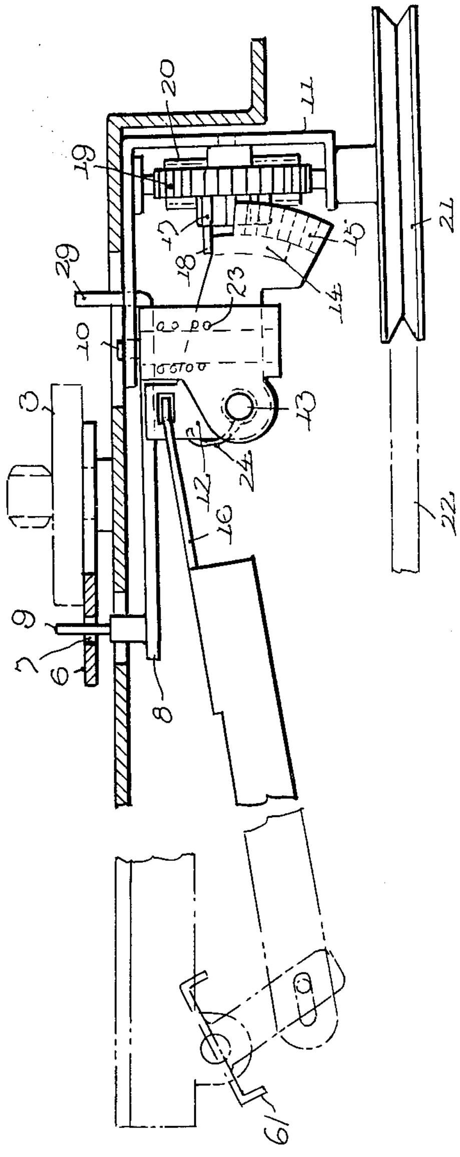
FIG. 2 is a fragmentary partial side view of the portion of the device shown in FIG. 1.
Figure 3:
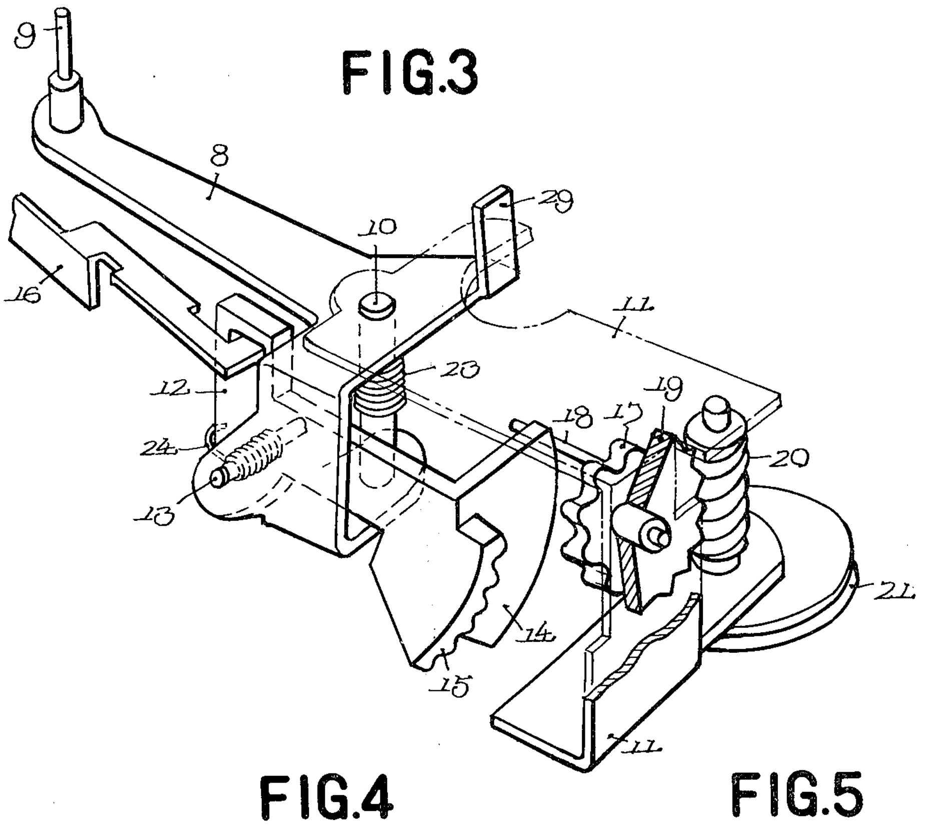
FIG. 3 is a perspective view of the portion shown in FIG. 2, FIGS. 4 and 5 are explanatory views of the second rocking lever of the automatic stop device according to the invention.

The pinion 17 is integrally provided with a worm wheel 19 which is always engaged with a worm gear 20. A pulley 21 is concentrically secured to the worm wheel 20 and is coupled to the fly-wheel 5 by a belt 22. The second lever 8 is always rotatably biased counterclockwise as a whole around the shaft 10 in FIG. 1 by a coil spring 23 engaged on the supporting frame 11, so that the camming portion 14 of the actuating piece 12 provided on the second lever 8 enters the area of movement of the projection 18. The actuating piece 12 itself is rotatably biased clockwise around the shaft 13 in FIG. 2 by another wire spring 24. A braking plate 25 is arranged on the chassis 1 so as to make contact with or move away from the reel tables 2 and 3. The braking plate 25 is adapted to move in the direction away from the reel tables whenever any one of the push buttons 31 is operated and to return to its original position when the push button is released.

One end of a reset lever 26 which is supported at its center portion by a shaft 27 on the chassis 1 is always urged in contact with the braking plate 25 by a spring 28 while the other end of the reset lever 26 terminates in the vicinity of an upstanding piece 29 provided at the rear end of the second lever 8 in such a manner that the end of lever 26 may act on the piece 29.

A resilient plate spring 30 is attached to the other end of the first lever 6. The spring 30 is positioned on the side of the braking plate 25 opposite the reset lever 26.

The automatic stop mechanism thus arranged will operate as follows.

Explanation will now be given to the operation of the mechanism at the mode of, for example, tape winding. Upon rotation of an electric motor mounted in the tape recorder, by depression of a push button, the reel table 3 is rotated counterclockwise, so that a magnetic tape is wound. At the same time, the first lever 6 which is frictionally coupled with the reel table 3, is also rotated counterclockwise by a frictional force exerted therebetween. On the other hand, as for the second lever 8, rotation of the motor causes the flywheel 5 to rotate, so that the pinion 17 will be also rotated through the belt 22, the pulley 21, the worm gear 20 and the worm wheel 19. As a result, the projection 18 eccentrically provided on the pinion 17 rotatably moves to push the camming portion 14 of the actuating piece 12 gradually which extends into the area of movement of the projection 18, and thus the second lever 8 is rocked clockwise around the shaft 10. When the projection 18 passes on the top of the camming portion 14 and then begins to descend therefrom, the second lever 8 pivotably returns gradually counterclockwise and the camming portion 14 again enters into the area of movement of the projection 18. When the projection 18 again reaches this area, the camming portion 14 is again pushed outward by the projection 18, so that the second lever 8 is turned clockwise. This rocking movement is continuously repeated all during the period of tape winding.

Figure 4:
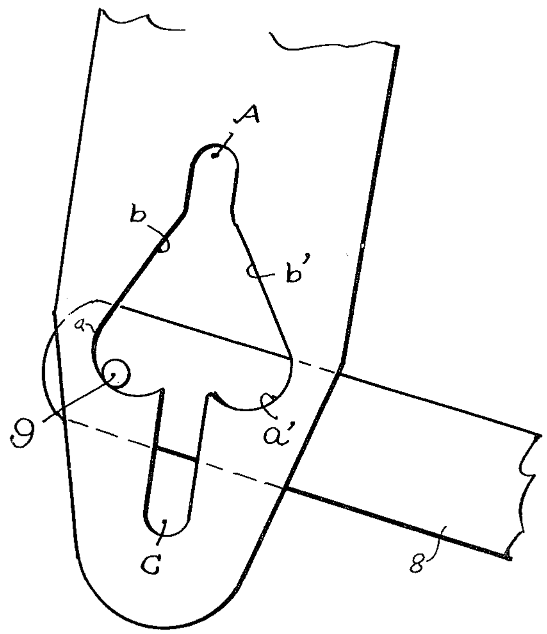

Referring to FIG. 4, the extent of rocking of the second lever 8 is confined by the indentation *a* of the camming opening 7 of the first lever 6. In other words, the pin 9 provided on the one end of the second lever 8 moves between the indentations *a* and A.

Further explanation will be given to the movement of the pin 9. The first lever 6 is subject to the counterclockwise rotational force produced by friction existing between the lever 6 and the reel table 3 due to rotation thereof while the second lever 8 is repeatedly rocked up and down around the shaft 10. Due to cooperation between the movement of these levers 6 and 8, the pin 9 repeatedly moves along the lateral wall b of the camming opening 7 between the indentation *a* and A in FIG. 4. In case the second lever 8 moves downward, the pin 9 engages indentation *a* of the camming opening 7 and further rocking movement of the lever 8 is retarded, so that the amount of such rocking movement of the second lever 8 is limited. In this instance, the projection 18 temporarily separates from the camming portion 14.

Upon completion of the tape rewinding operation, the reel tables 2 and 3 are stopped and rotational movement of the first lever 6 is also stopped due to disappearance of the rotational movement of the reel table 3. However, the electric motor is still rotating and rotation thereof is transmitted to the pinion 17 to cause the second lever 8 to rock. Accordingly, the first lever 6 is compulsorily rocked by the second lever 8 whatever stop position the former may take and lever 6 is rotated until it assumes the position where the pin 9 is on the same line as the axis of the elongated opening C of the camming opening 7 as shown in FIG. 4.

When the pin 9 is rocked clockwise and moves up along the lateral wall b of the camming opening, the first lever 6 is turned clockwise by the pin 9 against the friction coupling thereof with the reel table 3 and the pin 9 is compulsorily confined in the position where the pin 9 is in the indentation A.

In this situation, the projection 18 rests on the top station of the camming portion 14 and the following movement of the projection 18 causes the second lever 8 to rock counter-clockwise from the position where the pin 9 is in the indentaion A. As the first lever 6 maintains to stop and does not hinder the movement of the pin 9. The pin 9 enters elongated slot c of the camming opening 7 and thus the second lever 8 further rocks counterclockwise thereby to cause the rack 15 to mesh with the pinion 17. Thus, actuating piece 12 compulsorily turns counterclockwise in FIG. 2 around the shaft 13 and against action of the spring 24 and this turning movement moves the rod 16 so as to disengage a release mechanism of a push button, for example an engaging plate, so that a switch is opened to stop the driving of the motor. This means that the overall tape recorder automatically stops.

When the tape recorder stops as above mentioned, the braking plate 25 which has been away from the reel table 3 heretofore makes contact with the reel table 3 as a matter of course and thereby the reset lever 26 pushing the braking plate 25 in contact therewith follows the braking plate 25 and turns counterclockwise in FIG. 1. As a result, one end of the reset lever 26 pushes the upstanding piece 29 of the second lever 8, so that the second lever 8 turns clockwise around the shaft 10 and, due to this turning movement, the pin 9 located in the elongated slot *c* of the camming opening 7 comes out of the slot *c* into the camming opening 7. On the other hand, the first lever 6 is also slightly turned counterclockwise through the resilient plate spring 30 by means of the pushing action of the braking plate 25 and the pin 9 which has come out of the slot *c* engages indentation *a* of the camming opening 7.

Namely, this means that the tape recorder is reset to the condition in which the first lever 6 can be rocked for driving the reel tables, just after, automatic stopping of the tape recorder.

In this manner, one lateral wall b of the camming opening 7 serves in the winding mode, as described with respect to the previous operation while the other lateral wall *b'* serves to contact the pin 9 in the rewinding mode when the reel tables 2 and 3 rotate in a direction opposite to the winding mode as above described. In the same first winding mode, the reel tables rotate in the same direction as that of said winding mode, then the wall *b* serves in engaging contact with the pin *q*.

If it is assumed that the mode of the tape recorder is reversed during tape winding and rewinding operations, when the pin 9 is in the engagement condition with the indentation *a*, the first lever 6 turns in the reverse direction and the pin 9 has to transfer from the indentation a to the indentation *a'*. However, it may accidentally happen for the pin 9 to fall put into the elongated slot *c* and it is undesirable that the operation may be stopped.

For this purpose, the beginning end line of the slot *c* which opens into the camming opening 7 is formed slightly upward as shown in FIG. 4 and opening takes the shape of a heart. While the second lever 8 is given a counterclockwise turning inertia, namely, while the pin 9 engages indentation *a* of the camming opening 7, the first lever 6 is locked by the pin 9 and the first lever 6 is turned against the friction coupling force with the reel table 3, thereby enabling prevention of stopping of the above operation.

Figure 5:
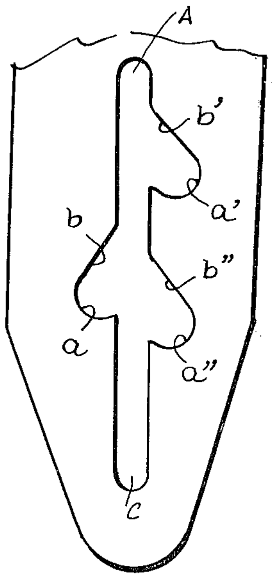

As shown in FIG. 5, a plurality of indentations *a'* are formed in any one side of the camming opening 7 and a single indentation a is formed at an opposite-position intermediate these indentations *a'*. Thus, even if the lock is released when the first lever 6 is turned in the reverse direction by changing over of the operation, a more positive exchange can be assured by arranging the pin 9 so that it apparently moves from the indentation *a'* to an indentation *a* or from the indentation *a* to an indentation *a''*, namely by turning the first lever 6 so as to grasp the pin 9 at the opposite indentation before the second lever 7 is turned so that the pin 9 falls into the slot *c* of the camming opening 7. In winding mode and rewinding mode, the walls *b* and *b'* are in contact with the pin 9 respectively, and the indentation *a''* assures the pin 9 not to fall into the slot *a* when the winding mode is changed to the rewinding mode.

As described above, since one lateral side wall *b* of the camming opening 7 serves in the tape winding mode as has been understood with respect to the above mentioned operation while the other lateral wall *b'* *serves in the tape rewinding mode, when the mode is changed as desired from the tape winding operation to the tape rewinding operation, the pin 9 must move from indentation a* to indentation *a''* without entering the slot *c* of the camming opening 7 and there is a concern for the pin 9 falling into the slot *c* of the camming opening 7. To remove such concern, the beginning end line of the slot *c* of the camming opening 7 is formed slightly upward as shown so that the entire configuration may take the shape of a heart. Alternatively, as shown in FIG. 5, a plurality of camming portions *b'* are provided for providing engagement of the pin 9 only at the side of tape rewinding and a sufficient time is provided between the lowermost identation portion of said plurality of camming portions and the indentation *a* of the tape winding side, before the pin 9 is grasped in the identation even when the pin 9 falls into the slot *c* of the camming opening. In this way, the inconvenience as encountered and as described above can be removed.

Figure 6:
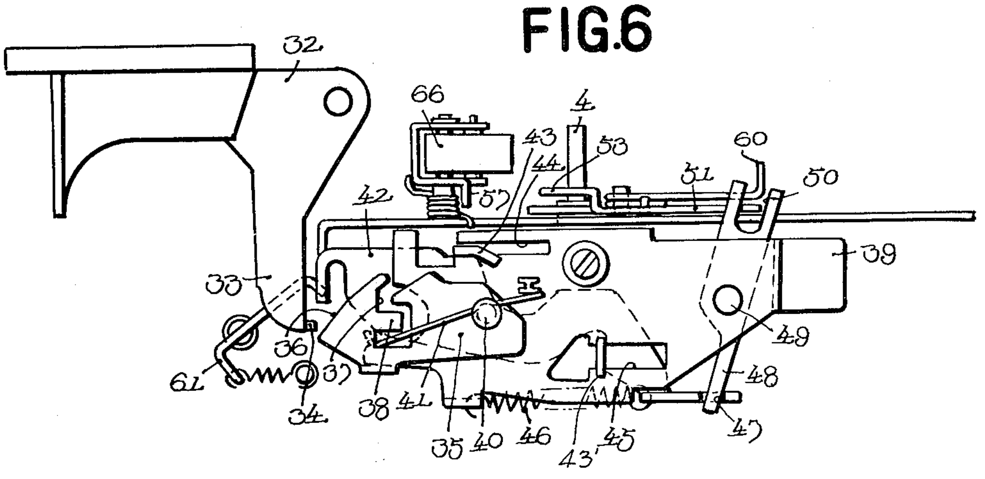
FIG. 6 is a schematic side view of the pause mechanism arranged in association with the automatic stop device.

In FIGS. 1 and 6, a series of push buttons are indicated by reference numeral 31 and one of them is a pause push button 32. The pause button 32 has a leg 33 provided with a lateral projection 34. In front of the projection 34, there is a movable locking plate 35, i.e. the so called well-known push-pull cam plate, having a slant face 36 (FIG. 6), an engaging face 37 and an obliquely laterally projecting disengageable face 38, plate 35 being resiliently pivoted upward on the mounting base 39 on one side of the tape recorder through a shaft 40 and a spring 41.

A plate 42 with one end facing the leg 33 in such a position as to be able to be pushed by the leg 33 is located along the base 39; and the projecting pieces 43 and 43' formed at a mid portion of the plate 42 slidably engages in an elongated holes 44 and 45 provided on the opposite side of the base 39. Between the plate 42 and the base 39, a spring 46 is provided for biasing the plate 42 to the side of the leg portion 33 of the pause button 32, and the plate 42 is provided at the other end with a notch 47 for engaging the lower end of a lever 48 with its mid-portion pivoted at a shaft 49. The lever 48 is bifurcated at its upper end at 50 and one end of the operator lever 51 loosely pivoted at the capstan 4 is engaged with this bifurcated portion 50. The operating lever 51 is provided with projections 52 and 53, the former being located in such a position to push a pin 54 on one end of an idler lever 55 with the other end pivoted at a shaft 56 while the latter is located in such a position to push a pinch roller arm 57, the idler lever 55 being provided with a driving rotary shaft 58 which can make contact with or move away from the winding reel table 3.

The operating lever 51 is provided with a shaft pin 59 around which a rocking confining member 60 consisting of a wire spring is wound and an extending portion of the member 60 is arranged in such a position as to push a lug 6a of the first lever 6 at one side thereof.

Figure 10:
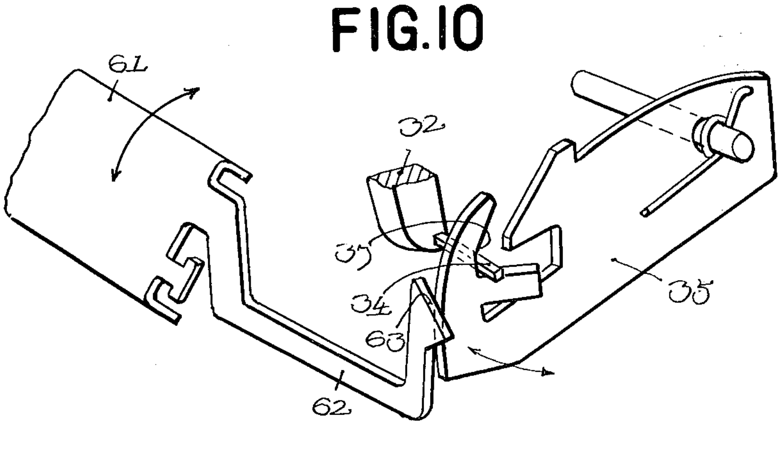
FIG. 10 is a perspective view of a movable block plate used in the present invention.

Referring to FIG. 10, an engaging plate 61 constituting the push buttons 31 has a releasing member 62 coupled thereto for turning following the of the engaging plate 61. The releasing member 62 has a tapered exclusion function face 63 which is arranged in such a position as to push against the end face of the movable locking plate 35. In FIG. 1, reference numeral 64 designates a head base adapted to move forward by operating the playing push button and a magnetic head 65 and a pinch roller 66 are mounted on the head base 64.

Figure 7:
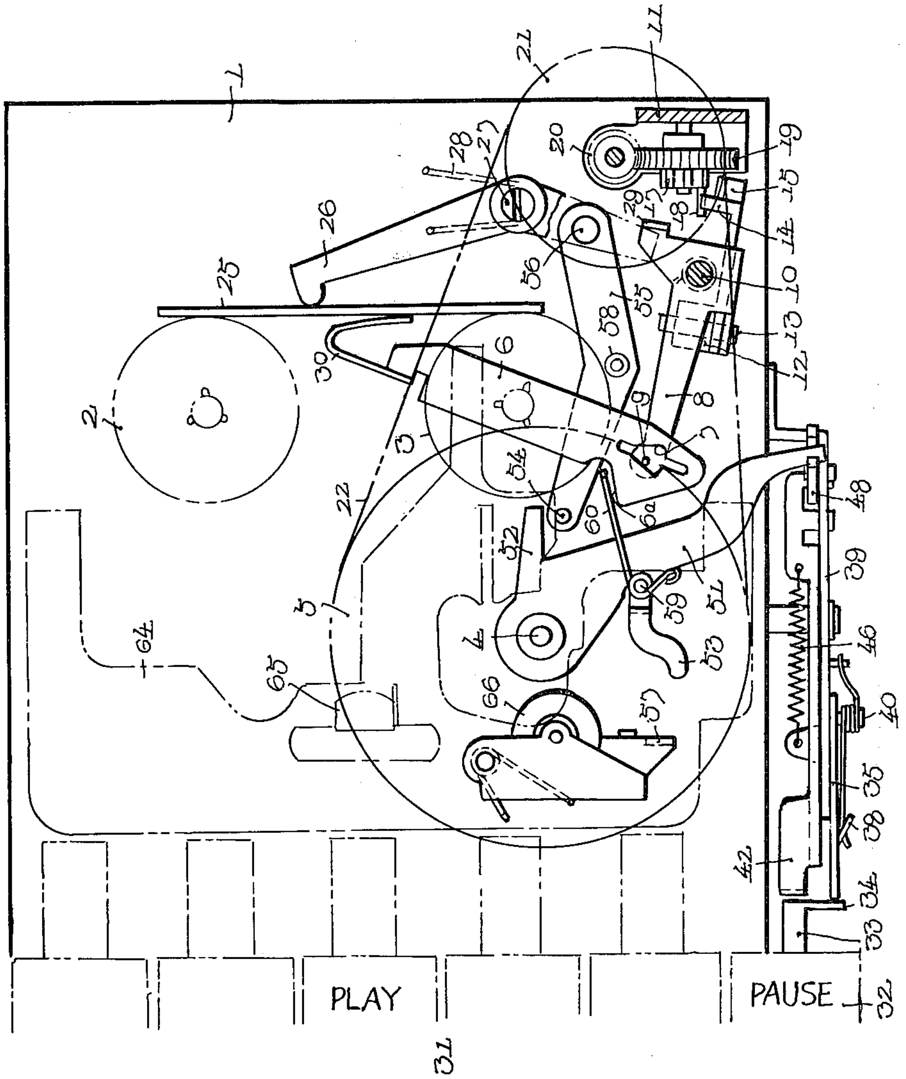
FIG. 7 is a plan view of the pause mechanism in a stop mode of the tape recorder.

The operation of the mechanism as above described is as follows:

FIG. 7 shows the mechanism in the stop mode of the tape recorder and when the playing push button is depressed, the head base is moved forward as shown in FIG. 1 to cause the tape to run.

Figure 9:
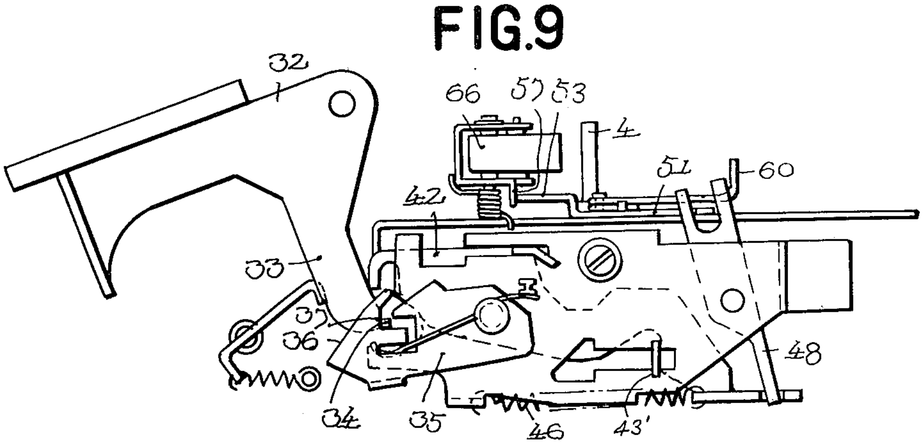
FIG. 9 is a side view of the mechanism positioned in the mode of FIG. 8
Figure 8:
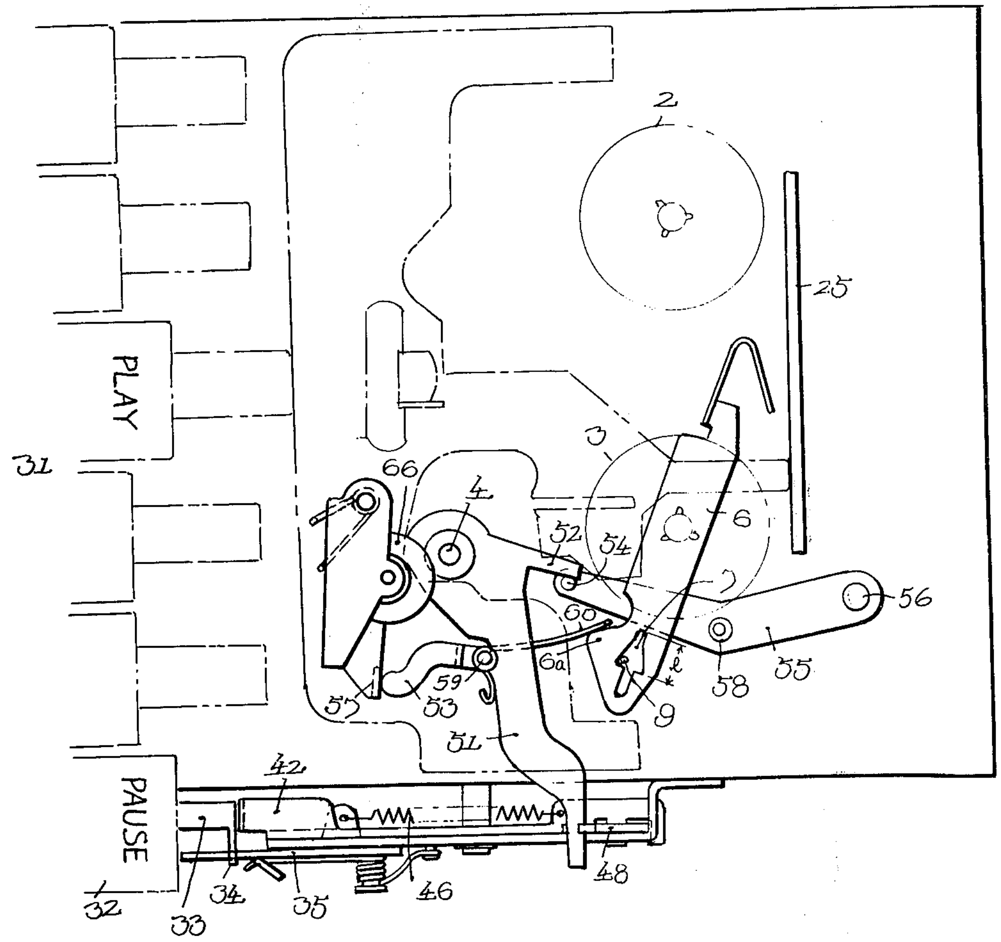
FIG. 8 is a plan view of the pause mechanism in a pausing operation.

At this time, when the pause button 32 is depressed as shown in FIGS. 8 and 9 for temporarily stopping the operation or for a pausing operation of the magnetic tape, the projection 34 against the slant face 36 of the movable locking plate 35 by movement of the button, so that the projection 34 is locked on the engaging face 37 at once. The plate 42 is advanced against the spring 46 by means of the leg portion 33 of the push button 32 and this advance will cause the lever 48 to rock so that the actuating lever 51 coupled to the lever 48 is turned for displacement. In this manner, one of the projections 52 of the actuating lever 51 pushes the idler lever 55 laterally thereby to cause the driving shaft 58 to move away from the winding reel table 3 to stop the same. Another projection 53 pushes the pinch roller arm 57, so that the pinch roller 66 which has been in contact with the capstan shaft 4 moves away therefrom.

Thereby the pausing operation is maintained. In the tape recorder, the first lever 6 always rocks by rotational force of the winding reel table 3 and movement of the pin 9 of the automatic stop mechanism in the camming opening 7 and the automatic stop mechanism maintains driving even when the reel table stops. Accordingly, the pin 9 still moves in the camming opening 7 by the stopping of the detection lever due to stoppage of the reel table 3 and thus the pin 9 which normally moves within the range 1 in FIG. 8 of the camming opening 7 enters a deep straight camming opening portion and the lever 6 rocks substantially. This results in operation of the automatic stop mechanism.

The present invention is therefore characterized by the provision of a rocking confining member 60 for the first lever in association with the pausing operation.

In greater detail, upon rotary displacement of the actuating lever 51 in the pausing operation as above mentioned, the confining member 60 makes contact with one side of the detection lever 6 as shown in FIG. 8 and the resulting resiliency causes the first lever 6 to be compulsorily pushed, so that the pin 9 may not fall into the deep straight camming opening, namely, the pin 9 may move compulsorily sliding along the edge of the camming opening within the operative range *l* within which the automatic stop mechanism does not work, whereby the tape recorder does not act to automatically stop at the pausing time. The lug 69 serves to ensure the rotational movement of the first lever 6.

According to the present invention, it is possible to provide an arrangement wherein the automatic stop system does not work at the pausing time by means of a highly simple and rational means using movement of the pausing operation member and associating the same with the first lever and a great advantage may be obtained by the pausing mechanism of the tape recorder equipped with such kind of automatic stop device.

What I claim is:

1. An automatic stop device for a tape recorder having a chassis, a tape transporting mechanism including a rotary driving source, a pair of winding reel tables, a capstan and a pinch roller, said device comprising:

a first lever having at one end a camming opening containing an elongated slot and engaging indentations, said first lever being pivotably mounted on one of said reel tables frictionally therewith, a second lever having at one end a pin engaging the camming opening of said first lever, means pivotably supporting the second lever on the chassis of the tape recorder such that said pin is rotatably biased towards the elongated slot of said camming opening of said first lever, an actuating piece having a fan-shaped camming portion at one end and rotatably attached to the said second lever such that the actuating piece may turn only in a direction perpendicular to the axis of rotation of said second lever and be rotatably biased in a given direction, a pinion rotatably driven by said rotary driving source of said tape recorder, and a projection eccentrically provided on said pinion in a position so as to be able to make contact with the fan-shaped camming portion of said actuating piece, so that under rotation of said reel table, said pin rocks within said camming opening of said first lever to engage the indentations thereof while when rotation of said reel table ceases, said pin enters said elongated slot of said camming opening of the first lever, thereby to provide a large amount of rotational rocking of said second lever for stopping the rotary drive source of the tape recorder.

2. An automatic stop device as set forth in claim 1 wherein the tape recorder has push buttons and a releasing mechanism therefor, said device further comprising a rod connected to the releasing mechanism for the push buttons, said rod being attached to said actuating piece, a rack provided in the vicinity of said fan-shaped camming portion, said rack meshing with said pinion when said pin of said second lever enters said elongated slot of said camming opening of said first lever and said second lever rocks to a great extent, thereby turning said actuating piece against the rotational biasing effect to move said rod to actuate said releasing mechanism of the push button.

3. An automatic stop device as set forth in claim 1 wherein said engaging indentations of said camming opening of said first lever connect with said elongated slot with a sharp angle provided between the indentations and the slot.

4. An automatic stop device as set forth in claim 1 wherein said camming opening of the said first lever is constituted by said elongated slot, a single first engaging indentation and a plurality of second opposite engaging indentations offset upwards and downwards with respect to said first indentation, said elongated slot being positioned between said first indentation and said plurality of second indentations.

5. An automatic stop device as set forth in claim 1 further including a brake plate movably supported on the chassis of the tape recorder so as to be in or out of contact with said reel table and a reset lever pivotably mounted on said chassis with one end in contact with said braking plate, said second lever having an upstanding piece which is engagable by the other end of said reset lever, whereby, when said braking plate comes into contact with the reel table incidentally to halt rotation thereof, said second lever is compulsorily turned due to turning of said reset lever so that the pin of said second lever may come out of the elongated slot of the camming opening of said first lever.

6. An automatic stop device as set forth in claim 5 further including a resilient plate spring mounted on said one end of the first lever facing said braking plate, such that when said braking plate comes into contact with the reel table incidentally to halt rotation thereof, said braking plate turns said first lever through said plate spring so as to bring said pin of said second lever into the engaging indentations of the camming opening of said first lever.

7. An automatic stop device as set forth in claim 1 wherein the tape recorder has idler rollers for engaging the reel tables, and operating push buttons including a pause push button, said device further including an actuating lever pivotably mounted on the chassis of said tape recorder so as to move said pinch roller away from said capstan and the idler rollers away from the reel tables when the pause push button is depressed, said actuating lever including a rocking confining member consisting of a resilient body, one end of which is positioned to engage the side wall of said first lever to cause said first lever to turn in a given direction through said rocking confining member upon turning of said actuating lever due to depression of said pause push button.

8. An automatic stop device as set forth in claim 7 wherein said rocking confining member comprises a wire spring and said first lever includes a projection piece positioned to engage said wire spring.

* * * * *